United States Patent Office 3,748,305
Patented July 24, 1973

3,748,305
COPOLYMERS OF ACETYLENES AND PHENOLS
Dwain M. White, Schenectady, and Howard J. Klopfer, Rexford, N.Y., assignors to General Electric Company
No Drawing. Filed July 29, 1971, Ser. No. 167,477
Int. Cl. C08g 23/00, 23/16
U.S. Cl. 260—47 UA                10 Claims

ABSTRACT OF THE DISCLOSURE

Dipropargyl ethers of dihydric phenols are readily copolymerized with 2,6-disubstituted phenols by an oxidative coupling process. Diacetylenic alkanes are borderline in their ability to be so copolymerized. Other diacetylenic compounds can be copolymerized providing the dipropargyl ether is also present. These copolymers are readily soluble in organic solvents and can therefore be used to produce coatings which are photosensitive and also can be thermally decomposed into carbon objects. The polymers are also useful as matrices for binding carbon fibers into fabricated articles.

---

This invention relates to synthetic polymeric compositions, and more particularly to copolymers of 2,6-disubstituted phenols capable of forming poly(phenylene oxides) and diacetylenic compounds wherein at least one of the diacetylenic compounds is a dipropargyl ether of a dihydric phenol.

Poly(phenylene oxides), sometimes called polyphenylene ethers, as a general class, are an extremely interesting group of new polymers. These polymers, both homopolymers and copolymers, and processes for producing them are disclosed in Hay U.S. Pats. 3,306,874, 3,306,875, and 3,432,466, all assigned to the same assignee as the present invention, which are hereby incorporated by reference as to the type of phenols and the conditions used for converting these phenols into their polymers. These poly(phenylene oxides) have many desirable properties and have found wide commercial acceptance. Generally, these poly(phenylene oxides) are poly(2,6-disubstituted-1,4-phenylene oxides) which are made by oxidative coupling of 2,6-disubstituted phenols.

Polymeric acetylenes are also an extremely interesting group of new polymers. These polymers, both homopolymers and copolymers and processes for producing them are disclosed in Hay U.S. Pats. 3,300,456 and 3,332,916. Photosensitive acetylenic compositions are disclosed in Hay U.S. Pat. 3,594,175. These patents are hereby incorporated by reference for a teaching of the various acetylenic compounds that can be used for our invention and the process of converting them to their various polymers, which is also applicable for making our copolymers.

The polymeric acetylenes are thermally unstable and, therefore, are readily decomposable into carbonaceous articles having wide utility, for example in making carbon fibers or conductive films on a nonconductive substrate. Poly(phenylene oxides) are very thermally stable compared to the polyacetylenes and, furthermore, have excellent film-forming and other physical properties. The thermal decomposition of the acetylenic polymers can be quite rapid, and in some cases almost explosive. This rapid thermal decomposition can be moderated by proper heat treatment or by treatment with solvents. It would be highly desirable to be able to prepare copolymers of these two widely divergent materials since the properties of the copolymer might have very interesting and useful properties which would be a combination of the desirable properties of both polymers.

Both the poly(phenylene oxides) and the polyacetylenes are made by an oxidative coupling reaction by reacting the phenols or diacetylenes with oxygen in the presence of a basic cupric-amine complex as disclosed in the above-mentioned patents. The reaction is exothermic and is generally carried out at as low a temperature as possible to prevent the formation of undesirable by-products. Generally, the oxidation reaction is initiated at as low a temperature as the reaction will start, as evidenced by the reaction becoming exothermic. Usually the oxidation reaction is controlled so that the maximum temperature does not exceed 100° C. and preferably does not exceed 80° C. The heat of reaction can be removed, for example, by radiation, convection or by cooling coils which can be either immersed in or surround the reaction vessel, etc. Ordinarily, the passage of oxygen or oxygen-containing gas is continued into the reaction mixture until no more heat is generated or the desired amount of oxygen is adsorbed.

Since the two polymers are prepared by essentially identical processes, it was of interest to see if the phenols and the acetylenic compounds could be copolymerized. However, attempts to copolymerize 2,6-disubstituted phenols with the readily available diethynylarenes, were unsuccessful. It was found that although polymerization of both the phenols and diacetylenic compounds did occur, the products in each case were mixtures of the two homopolymers rather than the desired copolymers. This was evidenced by the fact that when films of the polymerized product were cast from solution, the films were opaque because of the immiscibility of the one polymer in the other. Furthermore, because of the difference in solubilities of the two homopolymers, the poly(phenylene oxide) could be dissolved away from the polyacetylenic homopolymer.

Unexpectedly we found that when the diacetylenic compound was a dipropargyl ether of a dihydric phenol, copolymerization between these acetylenic compounds and the phenols did occur over the entire range of compositions.

Diethynylalkanes are borderline in their ability to copolymerize with the phenols. The product can be separated into two copolymers, one richer in the acetylenic moieties and the other richer in the polyphenylene oxide moieties than the starting mixture. Even more surprising, we found that these difficulties with diethynylarenes and diethynylalkanes could be overcome if the dipropargyl ether of a dihydric phenol was also present in an amount as low as 10 percent by weight of the diethynylalkane or diethynylarene. Furthermore, the phenol and the dipropargyl ether (and, to a lesser extent, the diethynylalkane) incorporated in such copolymers contribute to making the copolymer much more soluble in the usual organic solvents. Films cast from such solutions remain clear in marked contrast to the opaque films obtained from the compositions which were merely a mixture of the homopolymers. The copolymers obtained exhibit properties attributable to each of the components of the copolymer. For example, the polymers are photosensitive due to the incorporation of the acetylenic polymer. The thermal stability of the copolymer is better than the acetylenic polymer due to the incorporation of the poly(phenylene oxide). The degree to which these properties are exhibited is related to the amount of the particular copolymer ingredient contributing to this property thereby permitting a wide variety of polymer properties to be obtained by varying the composition of the copolymer prepared.

Although any of the various phenols disclosed in the Hay Pats. 3,306,874, 3,306,875 and 3,432,466 can be used in making our copolymers, the preferred phenols are the 2,6-disubstituted phenols disclosed in these patents. Because they are more readily available, the preferred phenols are those having the formula,

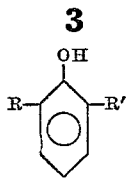

where R is lower alkyl or phenyl and R' is the same as R and, in addition, lower alkyl substituted phenyl and biphenylyl. These phenols readily participate in our copolymerization reaction to form repeating units by elimination of the hydrogen of the hydroxyl group and hydrogen in the para position to form 2,6-disubstituted-1,4-phenylene oxide units having the formula,

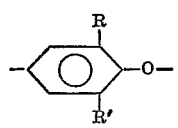

where R and R' are as defined above.

Although any of the various diacetylenic compounds disclosed in the Hay U.S. Pats. 3,300,456, 3,332,916 and 3,594,175 mentioned previously may be used, one of the dipropargyl ethers of the dihydric phenol should be present. The dihydric phenol can be a dihydric phenol of the benzene, naphthalene, anthracene, etc. series, for example, hydroquinone, resorcinol, catechol, the isomeric dihydroxynaphthalenes, the isomeric dihydroxyanthracenes, etc., or they can be dihydroxy substituted biphenyls or diphenyl ethers, e.g., for example, the various isomeric biphenols, for example, 2,2'-biphenol, 2,3'-diphenol, 2,4'-biphenol, 3,3'-biphenol, 3,4'-biphenol, 4,4'-biphenol, the isomeric bis(hydroxyphenyl) ethers, for example, bis(2-hydroxyphenyl) ether, bis(3-hydroxyphenyl) ether, bis (4-hydroxyphenyl) ether, 2-(3-hydroxyphenoxy)phenol, 2-(4-hydroxyphenoxy)phenol, 3 - (2 - hydroxyphenoxy) phenol, 3-(4-hydroxyphenoxy)phenol, etc.

The dihydric phenols can also be substituted with an alkyl carbonyl group, for example, 2,4-dihydroxyacetophenone, 2,4-dihydroxyacetophenone, 2,5-dihydroxyacetophenone, 2,4-dihydroxypropiophenone, acetylbiphenols, diacetylbiphenols, etc. Examples of aryl carbonyl substituted dihydric phenols are given later in the examples of benzophenones.

These dihydric phenols can also be the isomeric bis (hydroxyphenyl) sulfones, or the various isomeric dihydric phenols known as alkylene- or alkylidenediphenols, for example, 4,4'-isopropylidenediphenol, 2,2'-isopropylidenediphenol, 2,4' - isopropylidenediphenol, methylenediphenol, ethylenediphenol, ethylidenediphenol, 4,4'-(isopropylethylene)diphenol, etc.

Additional examples of dihydric phenols which we can use are the dihydric phenols which contain a ketone group separating two aryl groups, for example, the dihydroxybenzophenones, examples of which are, 2,2'-dihydroxybenzophenone, 2,3'-dihydroxybenzophenone, 2,3 - dihydroxybenzophenone, 2,4'-dihydroxybenzophenone, 3,3'-dihydroxybenzophenone, 3,4'-dihydroxybenzophenone, 4,4'-dihydroxybenzophenone, 2,5-dihydroxybenzophenone, 2,6-dihydroxybenzophenone, 2,4 - dihydroxybenzophenone, 3,5-dihydroxybenzophenone, 3,4-dihydroxybenzophenone, the dihydroxybenzils, the dihydroxyphenyl naphthyl ketones, the phenyl dihydroxynaphthyl ketones, the hydroxyphenyl hydroxynaphthyl ketones, etc.

Any of the above dihydric phenols can be substituted by halogen or a lower alkyl group, i.e., an alkyl group having 1 to 8 carbon atoms, typical examples being chlorohydroquinone, bromohyroquinone, tetrachlorohydroquinone, methylhydroquinone ethylhydroquinone, isopropylhydroquinone, butylhydroquinone, pentylhydroquinone, hexylhydroquinone, including cyclohexylhydroquinone, heptylhydroquinone, octylhydroquinone, etc., the corresponding halo and alkyl substituted catechols and resorcinols, etc., the halogen and lower alkyl substituted biphenols, the halogen and lower alkyl substituted bis(hydroxyphenyl) ethers, the halogen and lower alkyl substituted bis(hydroxyphenyl) sulfones, the halogen and lower alkyl substituted alkylene- and alkylidenebiphenols, the halogen and lower alkyl substituted benzophenones, etc.

The above dipropargyl ethers can all be represented by the general formula,

In the oxidative coupling reaction, the two hydrogens of the acetylene groups are removed so that the repeating unit which they contribute to the polymer is represented by the formula,

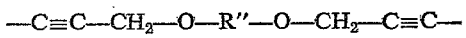

where R'' is selected from the group consisting of arylene, including lower alkyl substituted arylene, haloarylene, including lower alkyl substituted haloarylene,

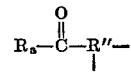

where R'' is as defined above and $R_a$ is lower alkyl or phenyl and —$R_b$—X—$R_b$— where $R_b$ is phenylene, lower alkyl substituted phenylene and halophenylene and X is —O—,

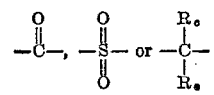

where $R_c$ is hydrogen or lower alkyl.

There is no minimum or maximum limit of either the phenol or the dipropargyl ether that can be copolymerized with the other. From a practical standpoint, there usually is no incentive in making a copolymer of the two components where either one is less than 0.1 percent, and generally less than 1 percent of the total of the two components. The presence of the dipropargyl ether in the copolymer, as mentioned previously, permits one or more diethynyl compounds which are not capable of copolymerizing alone with a phenol to be incorporated in the copolymer. The amount of such a diethynyl compound that can be incorporated surprisingly enough, is greater than the amount of the dipropargyl ether component and can be as much as 90 percent of the total diacetylenic component of the copolymer, with the exact amount being determined by the solubility characteristics of the particular diethynyl compound and the desired solubility characteristics in the copolymer. For example, the homopolymer of p-diethynylbenzene is extremely insoluble. This insolubility, is displaced even in its copolymers but can be overcome by having the concentration of the p-diethynylbenzene no greater than 25 percent of the total diethynyl component. Likewise, increasing the dipropargyl ether and/or the phenylene oxide component of the copolymer increases the solubility. The effect of the various acetylenic components on the properties of the copolymers will be clearly evident to those skilled in the art from the above teachings taken in conjunction with the various Hay patents mentioned above on the acetylenic polymers and phenol polymers. It is, therefore, evident that our copolymers can be varied in composition to provide a wide variety of characteristics and properties.

Although any of the various diacetylenic materials other than the dipropargyl ethers of dihydric phenols mentioned by Hay in the above three referenced patents on acetylenic polymers can be used in conjunction with the dipropargyl ethers, the most readily available and therefore the preferred diethynyl compounds are the diethynylalkanes and the diethynylarenes which have the general formula,

$$HC{\equiv}C-R_d-C{\equiv}CH$$

which contribute units to the copolymer which have the formula,

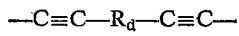

$$-C{\equiv}C-R_d-C{\equiv}C-$$

where $R_d$ is alkylene or arylene.

Typical examples of these diethynylalkanes and diethynylarenes are 1,4-pentadiyne, 1,5-hexadiyne, 1,7-octadiyne, 1,11-dodecadiyne, 1,17-octadecadiyne, etc., the diethynylbenzenes, for example, o-diethynylbenzene, m-diethynylbenzene, p-diethynylbenzene, the diethynylnaphthalenes, the diethynylanthracenes, etc., including those compounds where one or more hydrogens of the arylene nucleus are substituted with a lower alkyl group or halogen, for example, diethynyltoluenes, diethynylxylenes, diethynylbutylbenzenes, diethynylmethylnaphthalenes, diethynylmethylanthracenes, diethynylchlorobenzenes, diethynyldichlorobenzenes, diethynylbromobenzenes, diethynylchloronaphthalenes, diethynylchloroanthracenes, etc. Because they are more readily available, these diethynyl compounds generally have no more than 20 carbon atoms. Although acetylene is not a diacetylenic compound, it can act as such in forming the copolymers of my invention since it does have two HC≡ groups and only the hydrogen is involved in the coupling reaction. Therefore, acetylene can participate in the oxidative coupling reaction as though it were a diacetylenic compound rather than as a chain terminator like other monoacetylenic compounds.

Those copolymers of this invention which incorporate moieties of (a) diethynylalkanes, (b) diethynylarenes wherein the two ethynyl groups are on the same aromatic ring and in a para relationship to each other or (c) the dipropargyl ethers of dihydric phenol containing a carbonyl group to which at least one aryl group is attached, are very photosensitive with the photosensitivity increasing as the amount of such diethynyl compound increases in the copolymer. Either this photosensitivity or the thermal instability of the acetylenic component of the copolymer can be utilized to crosslink the copolymer so that it is no longer soluble in the solvents in which it formerly was soluble. This ability to be crosslinked is attained even with very low concentration of the acetylenic component of the copolymer. The compositions of this invention can be used as photoresist in the same manner as described by Hay in his U.S. Pat. 3,594,175 referenced above.

One or more of the above phenols and one or more of the above dipropargyl ethers of dihydric phenols and, if desired, one or more of the above diethynylalkanes or diethynylarenes are readily copolymerized by reacting them with oxygen in a liquid phase also containing, dissolved therein, a basic-cupric-amine complex in the general manner disclosed and using any of the various basic cupric-amine complexes disclosed in either the Hay patents covering the polyphenylene oxide or the polyacetylenic compounds. The reaction can be initiated at room temperature but requires a longer time than if carried out at an elevated temperature. On the other hand, too high a temperature favors formation of diphenoquinones from the phenol and side products from the diacetylenic compounds. The optimum temperature is in the range of 50–70° C. Since the reaction is exothermic, it is desirable to control the temperature so that it falls within this range or exceeds it only for a short period of time and then generally is not allowed to go above 80° C.

Control of temperature can be accomplished in many ways, by use of cooling coils, by varying the rate of oxygen addition, by varying the concentration of oxygen in the gas used since air or oxygen diluted with an inert gas can be used in place of pure oxygen, by the rate of addition of one or more of the reactants to the reaction medium, etc. Other techniques can likewise be used such as varying the ratio of catalyst to the monomers to be oxidatively coupled, the concentration of the reactants in solution, etc. Preferably the reaction is carried out in a solution in an inert organic solvent which is a solvent for all of the reactants, the catalyst system and, preferably, the copolymer product. A convenient solvent to use is o-dichlorobenzene since it is an excellent solvent for both those copolymers where the phenylene oxide is the major component as well as those copolymers where the acetylenic component is the major component. Generally, the amount of solvent used is such that the final concentration of the copolymer is in the range of 5–10 percent since higher concentrations tend to be so viscous that stirring and heat transfer become problems.

Water is a by-product of the oxidative coupling reaction and should not be permitted to accumulate in the reaction vessel to form a separate aqueous layer. Several techniques can be used, for example, by the use of desiccants, use of solvents that are miscible with water, etc., but a convenient means is to permit the gas stream to sweep the water from the reaction mixture. This is conveniently done when the temperature is in the range from 50–70° C. Further details as to how the reaction can be modified will be readily apparent to those skilled in the art in view of the teaching in the various Hay patents referenced above, and the specific details in the following examples.

In addition to starting with the phenol and the diacetylenic compound themselves, we can use the homopolymers of each of the components or the homopolymer of one or more component with one or more of the monomeric compounds. These are oxidatively coupled in the same manner as when the initial reaction mixture is the phenol or acetylenic compound itself. The products appear, in any case, to be block copolymers rather than a random type copolymer. When the initial materials are all homopolymers, the blocks appear to be individual blocks of higher molecular weight than when the starting materials are all the simple monomeric materials. This is evidenced by the fact that the properties of the two polymers obtained differ from each other. The copolymers obtained by reacting all polymeric starting materials have properties that more closely resemble the properties of the two starting polymers, for example, solubility in solvents, etc. Furthermore, films cast from such copolymers tend to be somewhat hazy rather than the clear films obtained when the starting materials are all monomeric. When the starting material is a mixture of polymeric material and monomeric materials, intermediate results are obtained. This will be illustrated further in one of the following working examples.

Based on the IR and NMR spectra, the physical properties of the copolymers obtained and the fact the monomeric or polymeric reactants can be used to produce our copolymers, it is believed that in the copolymer forming reaction, the monomeric acetylenic compounds are first oxidatively coupled to homopolymers of relatively low molecular weight if only one acetylenic reactant is used or an all-acetylenic copolymer of relatively low molecular weight when two or more monomeric acetylenic reactants are used. Likewise, the phenols are first oxidatively coupled to form relatively low molecular weight homopolymers or copolymers having only phenylene oxide repeating units. After the formation of these intermediates, copolymerization between the acetylenic polymer and phenol polymer occurs providing the acetylenic polymer contains an activated —$CH_2$— group. The —$CH_2$— group adjacent to an acetylenic group, as is found in the acetylenic alkane polymers, is somewhat activated but not to the extent that the —$CH_2$— which is between an acetylenic group and an ether group as is found in the propargyl ether polymers. Oxidative coupling occurs between the activated —$CH_2$— group and the hydrogen in the unsubstituted ring position of the phenylene oxide polymer. Such a reaction would explain why the diethynylalkanes are borderline and the propargyl ethers are much better in their ability to form our copolymers. A formula showing one such copolymer link is as follows where R, R' and R" are as previously defined:

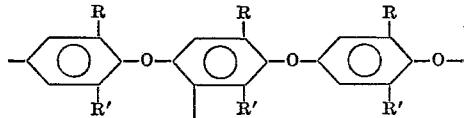
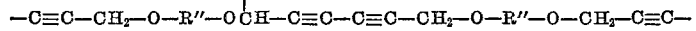

After the oxidative coupling reaction is completed, the catalyst residue is removed or deactivated, for example, by washing the copolymer solution with water, generally containing an acid to extract the catalyst, by addition of a strong chelating agent for the copper, by addition of a precipitant for the copper or by precipitation of the copolymer from the reaction mixture. The copolymer is then isolated by the usual techniques.

In order that those skilled in the art may better understand our invention, the following examples are given by way of illustration and not by way of limitation. In all the examples, parts and percentages are by weight and the temperature is reported in degrees centigrade, unless otherwise stated. The intrinsic viscosity, abbreviated $[\eta]$, is reported in deciliters per gram and is the value measured for a chloroform solution at 25° except for those polymers which had a haze temperature, as defined later, greater than 25°. In the latter case, the measurement was measured at 120° using o-dichlorobenzene as the solvent.

General procedure.—The total weight of the phenol and acetylenic compound is held constant at 5 g. A solution of these two reactants in 10 ml. of o-dichlorobenzene is added to a stirred solution of 0.15 g. of cuprous chloride, 0.17 g. of N,N,N',N'-tetramethylethylene diamine, 1.7 ml. of pyridine and 48 ml. of o-dichlorobenzene through which a finely divided stream of oxygen is bubbled at the rate of 1 cubic foot per hour, while the reaction vessel is immersed in a water bath maintained at 60°. Within the first few minutes a rise in temperature due to the exothermic nature of the reaction occurs but this soon subsides. Because of the excess oxygen used, no provision is required for the removal of the water of reaction. In general, the reaction is continued until there is no further noticeable increase in viscosity. When 2,6-diphenylphenol is one of the reactants, it has the property of making very viscous solutions so that in this case the reaction is discontinued when the viscous nature of the solution would cause problems of stirring and heat transfer if the reaction is continued. The polymer in solution is isolated by drop-wise addition of the solution into an excess of methanol. The precipitated polymer is washed with additional methanol and dried. Any polymer which precipitates during the reaction can be isolated by filtration prior to precipitating the polymer in solution, but generally this is not necessary.

EXAMPLE 1

Using the general procedure, 1.5 g. of 2,6-dimethylphenol and 3.5 g. of m-diethynylbenzene were reacted with oxygen. Within two minutes the homopolymer of m-diethynylbenzene started to precipitate from solution. In an attempt to overcome this precipitation of the homopolymer, a modification of the general procedure was made in which the 2,6-dimethylphenol was added to the reaction mixture and then the solution of the m-diethynylbenzene in the 10 ml. of o-dichlorobenzene was added dropwise over about an 8 minute period. The temperature gradually rose during the addition from 60 to 71°, then decreased to 60° and was maintained at this temperature. However, after three minutes, precipitation of the polymer was noted. After a total reaction period of 160 minutes, the reaction mixture was added to methanol containing 1% of concentrated aqueous hydrochloric acid. A yield of 4.66 g. of polymer was obtained which is a 94% yield based on the total weight of the two reactants, indicating that both reactants had participated in the oxidative coupling reaction. Chloroform extraction of the isolated polymer dissolved 20% of the original sample weight. This soluble portion was identified as poly(2,6-dimethyl-1,4-phenylene oxide), indicating that little, if any, copolymerization had occurred.

Similar results were obtained when an attempt was made to copolymerize 0.5 g. of 2,6-dimethylphenol, 0.27 g. of p-diethynylbenzene and 4.23 g. of m-diethynylbenzene. This mixed polymer was somewhat more soluble than the above mixed polymer and its intrinsic viscosity could be measured at 120° in dichlorobenzene giving a value of 0.99.

The fact that the total yield of polymer and the amount of recoverable homopolymer of poly(2,6-dimethyl-1,4-phenylene oxide) is not quantitative is not surprising since at the temperature used, the oxidative coupling reaction converts some of the 2,6-dimethylphenol to the corresponding diphenoquinone rather than polymer. This by-product would not be recovered under the work up procedure. Furthermore, complete extraction of one polymer from another is extremely difficult, if not impossible to attain. Infrared spectra of the isolated polymers indicated that the poly(2,6-dimethyl-1,4-phenylene oxide) which was extracted was free of any acetylenic polymer whereas the infrared spectra of the acetylenic polymer remaining after the extraction step showed only trace amounts of unextracted poly(2,6-dimethyl-1,4-phenylene oxide).

EXAMPLE 2

In this example, the general procedure was modified somewhat to increase the catalyst concentration with respect to the phenol and acetylenic reactant in an attempt to achieve copolymerization. A solution of 7 g. of m-diethynylbenzene and 3 g. of 2,6-diphenylphenol in 15 ml. of o-dichlorobenzene was added to a vigorously stirred solution of 1.5 g. of cuprous chloride, 3 ml. of N,N,N',N'-tetramethylethylenediamine and 17 ml. of pyridine in 100 ml. of o-dichlorobenzene heated to 60° while bubbling a fine stream of oxygen through the solution at a rate of 1 cubic foot per hour. The reaction temperature rose to 85° within 2 minutes and then gradually decreased. After 23 minutes, the reaction mixture was cooled and the solid precipitate, which had precipitated, was filtered off, washed with methanol and dried. There was obtained 6.54 g. of polymer whose infrared spectrum of a cast film was identical to that of a known poly(1,3-phenylenediethynylene). The filtrate was added to methanol producing a precipitate of polymer weighing 3 g. whose infrared spectrum of a cast film was identical to that of poly(2,6-diphenyl-1,4-phenylene oxide) containing a trace amount of poly(1,3-phenylenediethynylene).

When this example was repeated but using a ratio of 1 part of 2,6-diphenylphenol to 9 parts of m-diethynylbenzene, similar results were obtained except that the isolated poly(2,6-diphenyl-1,4-phenylene oxide) weighed 1.1 g. and the isolated poly(1,3-phenylenediethynylene) weighed 8.4 g.

EXAMPLE 3

Using the general procedure but reducing the oxygen flow to 0.75 cubic feet per hour, a mixture of 2.5 g. of 2,6-dimethylphenol and 2.5 g. of 1,7-octadiyne was oxidatively coupled. In 2 minutes, the maximum temperature reached 77°. After 45 minutes, the reaction mixture was hazy so the reaction was stopped and the polymer precipitated by pouring the reaction mixture into methanol acidified with aqueous hydrochloric acid. After washing and drying, there was obtained 4 g. of polymer which was insoluble in dichloromethane. On cooling a hot 1% solution of the polymer in o-dichlorobenzene, haze formation was noted at 38°. Intrinsic viscosity of the solution measured in o-dichlorobenzene at 120° was 0.11. When treated with benzene, approximately 75 percent of the polymer dissolved. The residue was still soluble in hot o-dichlorobenzene. The IR spectra of the two polymers showed that both were copolymers and contained moieties of the two starting materials. The benzene-soluble one was richer in phenylene oxide moieties than the polymer which was benzene-insoluble. The initial mixture of the two copolymers could be cast as a clear film from an o-dichlorobenzene solution by evaporation of the solvent at 110°.

EXAMPLE 4

Using the general procedure, 1.5 g. of 2,6-dimethylphenol and 3.5 g. of the dipropargyl ether of isopropylidene-4,4'-bisphenol hereinafter for convenience and brevity referred to as BPAD was oxidatively coupled. The temperature rose to 77° in 1.5 minutes and then dropped to 60° where it was maintained for a total reaction time of 225 minutes. The isolated polymer weighed 4.42 g. and had an intrinsic viscosity of 0.65. A cast film of this material on a metal surface was used as a photoresist by exposing isolated portions of the film to ultraviolet radiation which caused crosslinking of the exposed surfaces but left the unexposed surfaces so that it could be dissolved with the usual solvents for the polymer. Very low exposure times were sufficient to cause crosslinking of the exposed surfaces.

Because the homopolymers from both of these materials are readily soluble in the usual solvents, it was impossible to test for the presence of homopolymer by the usual extraction procedure. The properties of this polymer were compared with a blend of 0.15 g. of poly (2,6-dimethyl-1,4-phenylene oxide) having an intrinsic viscosity of 0.42 and 0.35 g. of the polymer obtained by oxidatively coupling BPAD, hereinafter abbreviated as poly-BPAD, having an intrinsic viscosity of 0.65. The properties of the blend were compared with those of the isolated polymer. It is known that the homopolymer of poly(2,6-dimethyl-1,4-phenylene oxide), hereinafter abbreviated poly-DMP, will initially dissolve in dichloromethane but will precipitate upon standing. A comparison of the polymer of this example with the blend as well as with the homopolymers used in making the blend is shown in Table I:

intrinsic viscosity of 0.95. The results are shown in Table II.

TABLE II

| Composition | Yield [1] | [η] | Solubility in CH₂Cl₂ | Film cast from CHCl₃ | Gel [2] |
|---|---|---|---|---|---|
| A | 86 | 0.48 | Complete | Clear | None. |
| B | 87 | 1.64 | [3] | Slightly hazy | Some. |
| C | 86 | 0.66 | Complete | Clear | Trace. |
| D | 90 | 1.03 | [3] | do | None. |
| E | | | [3] | Hazy | |

[1] Gel-free basis.
[2] Formed during reaction.
[3] Entire sample dissolves, then portion precipitates on standing.

These results show that the copolymers can be prepared either from the phenol and the diacetylenic compound or from their homopolymers or combinations thereof. When poly-DMP is used, some homopolymer is present in the copolymer product.

When the oxidative coupling of a mixture of equal parts of DMP and BPAD was carried out at 28° rather than 60° some precipitation occurred from a dichloromethane solution of the polymer product showing the presence of some homopolymer. Apparently at the lower temperature the polymerization of DMP proceeds at a faster rate than the BPAD causing some homopolymer to be formed or at least some copolymer having such large blocks of poly-DMP are present in the copolymer that it resembles the homopolymer.

EXAMPLE 5

Using the standard procedure, a mixture of 1.5 g. of 2-methyl-6-phenylphenol (MPP) and 3.5 g. of BPAD were oxidatively coupled. A maximum temperature of 73° was reached in 1.5 minutes and the oxidative coupling reaction was terminated after a total reaction time of 65 minutes. After first precipitating the polymer in methanol, it was redissolved in benzene and decolorized with several drops of hydrazine hydrate and the polymer then reprecipitated. There was obtained 4.93 g. of polymer having intrinsic viscosity of 0.86. The polymer produced clear, tough, flexible films when cast from solution, whereas a blend of the two homopolymers produced a hazy nonhomogeneous film, thereby indicating the lack of any homopolymers of the reactants.

EXAMPLE 6

A mixture of 1.5 g. of 2,6-diphenylphenol (DPP) and 3.5 g. of BPAD were oxidatively coupled using the general procedure except using benzene as the solvent and a reaction temperature of 55° A maximum temperature of 61.3° was reached in 2 minutes. The reaction was terminated after a total reaction time of 43 minutes. If the reaction was continued for a longer time, the solution

TABLE I

| | Solubility in CH₂Cl₂ | Films cast from CHCl₃ solution | Glass transition temperature, degree |
|---|---|---|---|
| Polymer of Example 4 | Stays in solution | Clear; flexible; smooth surface | 74 |
| Blend of poly-DMP and poly-BPAD | Dissolves then poly-DMP precipitates. | Translucent; rought, irregular surface. | 93 |
| Poly-DMP | Dissolves then poly-DMP, rapidly precipitates. | Clear; flexible; smooth surface | 217 |
| Poly-BPAD | Stays in solution | do | 132 |

These results show that the polymer of Example 4 is a copolymer rather than a mixture of the two homopolymers.

This example was repeated with the following four variations in the composition of the mixture subjected to the oxidative coupling reaction: (A) 2.5 g. DMP and 2.5 g. of BPAD, (B) 2.5 g. of poly-DMP having an intrinsic viscosity of 0.71 and 2.5 g. of poly-BPAD having an intrinsic viscosity of 0.92, (C) 2.5 g. of DMP and 2.5 g. of poly-BPAD having an intrinsic viscosity of 0.92, (D) 2.5 g. of poly-DMP having an intrinsic viscosity of 0.71 and 2.5 g. of BPAD. A control (E) was prepared which was a blend of 2.5 g. of poly-DMP having an intrinsic viscosity of 0.71 and 2.5 g. of poly-BPAD having an became extremely viscous and if carried still further would cause gel formation. There was obtained 3.98 g. of polymer having an intrinsic viscosity of 0.45. This product likewise produced a clear, tough, flexible film when cast from solution whereas the blend of the homopolymers produced hazy, nonhomogeneous films, thus showing the lack of any homopolymer of the two reactants.

From the results of the above experiments, it is obvious that dipropargyl ethers of dihydric phenols can form copolymers with various 2,6-disubstituted phenols but this is not true for the aromatic diacetylenic compounds. The following examples show, however, that these other diacetylenic compounds can be incorporated into copolymers providing they are used in conjunction with the dipropargyl ethers of a dihydric phenol.

EXAMPLE 7

The compositions based on a percentage of each constituent which is oxidatively coupled, the yield, intrinsic viscosity and $T_H$, the temperature at which a haze appears when a 1 percent solution of the polymer is cooled from 120° C. are all given in Table III. m-DEB and p-DEB are used to designate m- and p-diethynylbenzenes, respectively. The other abbreviations have been previously designated.

TABLE III

| Percent composition | 1 | 2 | 3 | 4 | 5 | 6 | 7 | 8 | 9 |
|---|---|---|---|---|---|---|---|---|---|
| BPAD | 1 | 10 | 45 | 10 | 10 | 5 | 5 | 10 | 10 |
| m-DEB | 8 | 37 | | 75.2 | 80 | | | 37 | 75.2 |
| p-DEB | 1 | 3 | 5 | 4.8 | | 15 | 45 | 3 | 4.8 |
| DMP | 90 | 50 | 50 | 10 | 10 | | | | |
| DPP | | | | | | 80 | 50 | 50 | 10 |
| Yield | 82 | 70 | 85 | 93 | 94 | 92 | 85 | 90 | 95 |
| [η] | .21 | .61 | .28 | .81 | .81 | | | .52 | .83 |
| $T_H$ | <25 | <25 | <25 | 41 | 66 | >120 | >120 | <25 | 40 |

In order to have some appreciation for the solubility data given above, it should be kept in mind that an all-acetylenic copolymer having only the acetylenic components of composition 1 would have a $T_H$ of about 36° and that for compositions 6 and 7 would be completely insoluble. The composition 7 was somewhat hazy at 120° whereas composition 6 was only very slightly hazy at the same temperature. A homopolymer could not be extracted from any of these copolymers.

All of these compositions are photosensitive and can be used to produce photoresist layers for use in making printed circuits, printing plates, etchings, etc. They likewise may be used to produce coatings on substrates or as a binder or to produce specific articles wherein the shaped articles or the coated surfaces are later carbonized and even graphitized, if desired, to produce carbon fibers, resistors, conductive paths, etc. Likewise, variations may be made in specific composition of the polymers to obtain modifications in the actual composition to meet the requirement of specific applications. These and other modifications or variations of the present invention are possible, in light of the above teachings. It is, therefore, to be understood that such changes may be made in the particular embodiments of the invention described which are within the full intended scope of the invention as defined by the appended claims.

What we claim as new and desired to secure by Letters Patent of the United States is:

1. Polymers whose molecular structures comprise repeating units having the formula, (A) 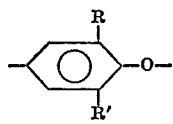

and repeating units having the formula, (B) —C≡C—CH₂—O—R″—O—CH₂—C≡C— where R is lower alkyl free of a tertiary α-carbon atom or phenyl, R′ is the same as R and, in addition, lower alkyl substituted phenyl or biphenylyl, and R″ is selected from the group consisting of arylene, including lower alkyl substituted haloarylene,

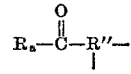

where R″ is as defined above and $R_a$ is lower alkyl or phenyl and —$R_b$—X—$R_b$— where $R_b$ is phenylene, lower alkyl substituted phenylene or halophenylene and X is —O—,

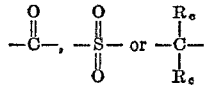

where $R_c$ is hydrogen or lower alkyl.

2. The polymers of claim 1, which, in addition to having repeating units A and B have repeating units of the formula,

where $R_d$ is alkylene or arylene.

3. The polymers of claim 1, wherein R and R′ are methyl or phenyl, R″ is phenylene or isopropylidenebisphenylene.

4. The polymers of claim 2, where R and R′ are methyl or phenyl, R″ is phenylene, biphenylene, or isopropylidenebisphenylene and $R_d$ is phenylene.

5. The polymers of claim 1, where R and R′ are each methyl, and R″ is 4,4′-isopropylidenebisphenylene.

6. The polymers of claim 2, where R and R′ are each methyl, R″ is 4,4′-isopropylidenebisphenylene and $R_d$ is phenylene of which 0–25 percent is 1,4-phenylene and the balance is 1,3-phenylene.

7. The polymers of claim 1, where R is methyl, R′ is phenyl, and R″ is 4,4′-isopropylidenebisphenylene.

8. The polymers of claim 2, where R is methyl, R′ is phenyl, R″ is 4,4′-isopropylidenebisphenylene and $R_d$ is phenylene of which 0–25 percent is 1,4-phenylene and the balance is 1,3-phenylene.

9. The polymers of claim 1, where R and R′ are each phenyl and R″ is 4,4′-isopropylidenebisphenylene.

10. The polymers of claim 2, where R and R′ are each phenyl, R″ is 4,4′-isopropylidenebisphenylene and $R_d$ is phenylene of which 0–25 percent is 1,4-phenylene and the balance is 1,3-phenylene.

References Cited
UNITED STATES PATENTS 3,201,370   8/1965   Butler _____ 260—47
3,484,411   12/1969   Matzner _____ 260—75

JOSEPH L. SCHOFER, Primary Examiner

C. A. HENDERSON, Jr., Assistant Examiner

U.S. Cl. X.R.

96—35.1, 36 R, 115 R; 260—47 UP, 49, 62, 80 P, 823